Nov. 4, 1969 J. HILGENDORF ET AL 3,477,064
SYSTEM FOR EFFECTING THE READ-OUT FROM A DIGITAL STORAGE
Filed March 28, 1968
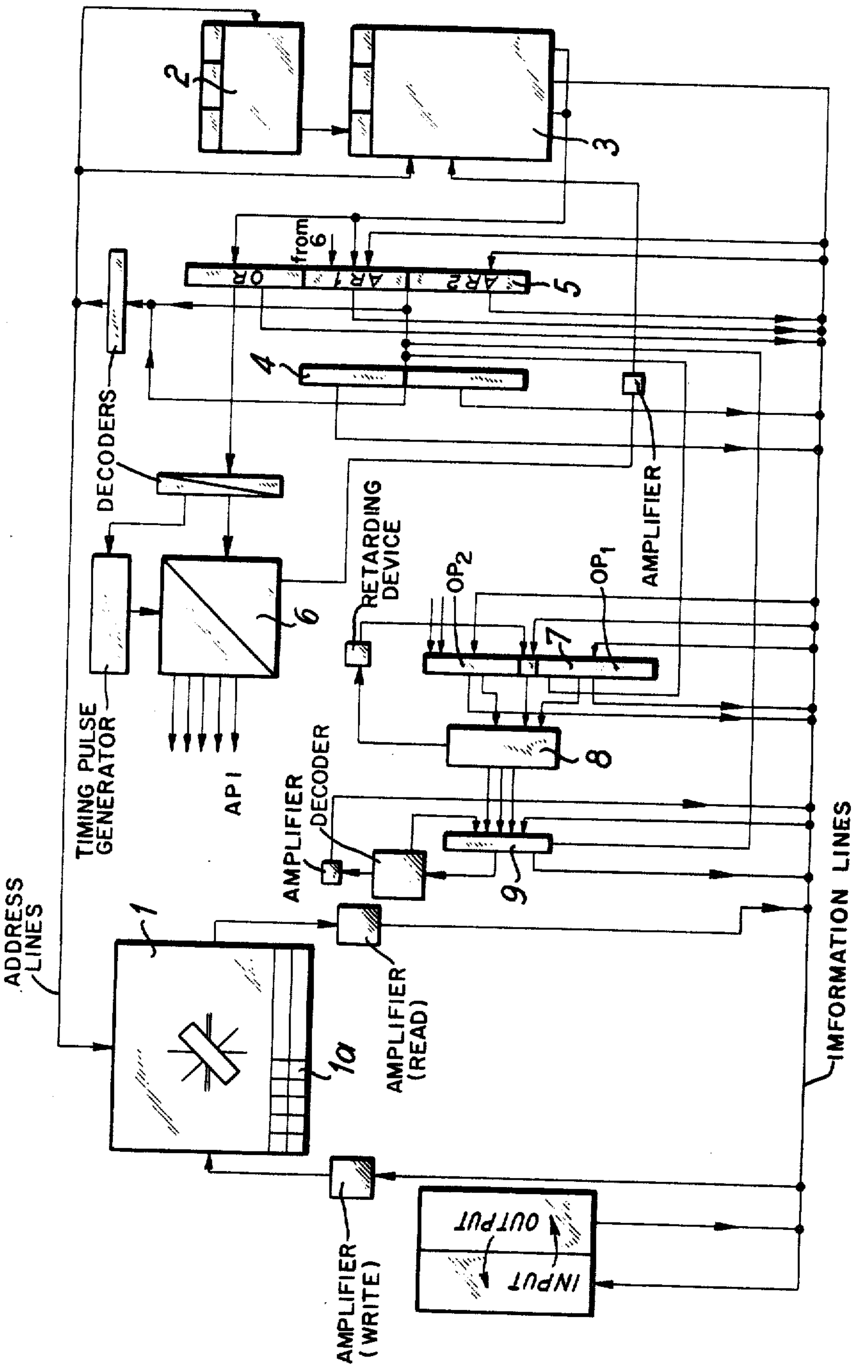

United States Patent Office 3,477,064
Patented Nov. 4, 1969

3,477,064
SYSTEM FOR EFFECTING THE READ-OUT FROM A DIGITAL STORAGE

Joachim Hilgendorf and Froese Hasko, Villingen, Germany, assignors to Kienzle Apparate G.m.b.H., Villingen, Black Forest, Postfach, Germany Filed Mar. 28, 1968, Ser. No. 720,754
Claims priority, application Germany, Mar. 31, 1967, K 61,868
Int. Cl. G06f *1/00, 7/00, 15/00*
U.S. Cl. 340—172.5 4 Claims

ABSTRACT OF THE DISCLOSURE

Read-out of information stored in two locations in a digital storage is effected under control of only one address. The address is shifted into a register, and the first part of the information is read out under control of this address. The address is then automatically modified, and the second part of the information, stored in the second location, is then read-out.

BACKGROUND OF THE INVENTION

This invention relates to a system for reading out information from storage means in digital data processing machines. In general, these data processing machines contain two fixed storages, one for a macroprogram and one for microprogram. They also further contain a magnetic core storage which generally cooperates with the input and output units of the data processing machine and whose contents may be changed by entering new information and erasing the old. Some type of arithmetic unit, for example a simple adder is generally also present. This is adapted to achieve the four arithmetic operations based on simple addition processes. The magnetic core matrix storage, or temporary storage serves a number of purposes. It may, for example, be used for temporary storage of factors for the arithmetic processes, intermediate results, end results, and for storage of various constant factors. It may also serve to store addresses which are required for the different processes taking place within the machine.

For reasons of economy, such core storages, which consist of a plurality of planes, are constructed in such a manner that each point in the matrix has the same number of magnetic cores corresponding to it. When it is desired to store digits, no difficulty arises since the decimal digits 0 to 9 may be represented by four bits (four cores) in a binary system. In order to effect an automatic check-out of the correctness of the individual binary numbers, generally five bits are used for a digit. The fifth, or redundant bit is used for parity control. In general, the machines used at the present time require a five bit binary number for choosing each row and column in a magnetic core matrix. Thus to select a particular point, a ten place address is required. Such a ten place binary number allows choice of one out of a possible 1024 different combinations. This in turn corresponds to the number of micro-commands generally used in todays data processing machines. Since, as was mentioned above, the magnetic core storage is used also for the storage of such addresses, the difficulty results in that a ten place address must be stored in a core storage having only five planes. A known solution for this problem is to add an additional core storage having five planes to the corresponding part of the first storage. This, of course, results in greatly increased expense. Furthermore, it is known that it is possible to store a ten place address in two storage locations having five cores each. Since, however, a ten place address is necessary to select one storage location in the matrix, such information stored in two separate locations requires the use of two micro-commands for a complete readout. This results in a decrease of the capacity of the storage for the micro-commands. This is a serious problem since, under normal operation, all these micro-command storage locations are required in operation.

SUMMARY OF THE INVENTION

This invention is a sytem for use in a data processing machine having a storage adapted to contain a plurality of information units, each consisting of a predetermined plurality of bits, in a plurality of storage locations corresponding to said plurality of information units. Said data processing machine further is adapted to store major information units, consisting of a number of bits exceeding said predetermined plurality of bits in at least a first and second one of said storage locations. Said data processing machine also has a program with addresses consisting of the plurality of bits required to select one of said storage locations. The invention comprises a system and method for reading said major information units out of said storage under control of only one of said program addresses. The read-out system comprises register means adapted to contain said addresses. It further comprises read-out means adapted upon energization to read out the information unit in the storage location corresponding to the address in said register. Also comprised are means for transferring the program address corresponding to said first storage location into said register, and energizing said read-out means, thus causing said first part of said major information unit to be read-out. It comprises means for changing the address in said register to correspond to said second storage location, upon completion of the read-out of said first part of said major information unit, and re-energizing of said read-out means, thus causing said second part of said major information unit to be read-out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The Figure is a block diagram showing a data processing machine using the system of the present invention.

DESCRIPTION OF THE PREFERRED EMBODIMENT

In the Figure, reference numeral 1 refers to a storage, in this case a magnetic core storage which is uniformly constructed as a three-dimensional storage having five bit planes. Each plane consists of a 16 x 16 core matrix, or, if required, a 32 x 32 core matrix. The latter type of storage would be adapted to hold 1024 information units each consisting of five bits. In order to read in and read out of the storage, ten place addresses would thus be required. A permanent storage 2 containing the macro-program and a permanent storage 3 containing the micro-program are also shown on this Figure. These storages may for example be embodied in wired core matrixes. The micro-program storage may for example comprise a 16 x 16 core matrix each of whose lines comprises 64 commands. Each command comprises a ten place address and a six place operational part. The construction of the macro-command storage need not be discussed further since it is not relevant to the subject invention. It need only be said that a selected macro-command determines which of the 1024 micro-commands follows another for the control of the machine. The succession of micro-commands is determined by a step register 4. The micro-command is transferred into register means, here a working register 5, which consists of part OR, AR. The part OR corresponds to the operational part which controls machine function by the opening and closing of subsequent gates. The address part controls the read-out of an information unit from a specified storage location. This information unit may for example be the digit of a number. This is then transferred into an intermediate register 7 and subjected to operations in the adder 8 and a central register 9. The intermediate register 7 consists of ten places for two information units, or, alternatively one major information unit which was stored in two storage locations. It may also have a further place indicating whether the previous arithmetic operation resulted in a carry. The major information unit may in this example be also an address, which was stored in two storage locations in preceding parts of the program.

The operations described above take place in conventional machines in the above described fashion or in a similar fashion. The method and system of this invention comes into play for micro-program commands which signify that a value is to be read-out of a storage location corresponding to the address in the micro-command. This address, for purposes of illustration, consists of ten places. Such addresses are stored in part 1*a* of the storage 1 and preferably in two neighboring storage locations. Thus, one storage location, which consists of the intersection of a line and a column, each of which is selected by a five bit number, may consist of a first half OLLLO stored in part AR1 of register 5 and a second half OOOLO stored in part AR2 of register 5. The total address in register 5 then reads: OOOLO–OLLLO. Under control of this addres in register 5 the first part of a major information unit is located and transferred into a part OP1 of an intermediate storage 7. Now the step means for changing the address in the register means to correspond to the second storage location take effect. Under control of the control circuit 6, for example, the lowest place of part AR1 of register 5 receives a pulse which changes this place from O to L, thus changing the address to OOOLO–OLLLL. This is the address corresponding to the second storage location. The contents of the storage 1 are then read-out under control of this address. This transfers the contents of the second storage location into the part OP2 of the intermediate storage 7. This completes the transfer from storage of a ten place number. The contents of the part AR of register 5 are now no longer required. If the number transferred from the storage is in turn an address, as has been mentioned above, it is now possible to transfer this address into the part AR of register 5 from the intermediate storage 7. The operational part OR of register 5 remains unchanged. Under control of the address now in the register, which has been read-out from storage 1, the storage 1 is again read-out and a number is transferred into intermediate storage 7 which may be required for the particular arithmetic operation. The exact use to which this last number is put is not relevant in respect to the present invention. The operations described above may, of course, be performed under control of timing pulses available in the data processing machine, but not illustrated in the figure.

In the preceding example a read-out took place from a storage location corresponding to an address which had been previously stored in two storage locations in the magnetic core matrix. This address was taken from the magnetic core matrix storage under control of only one micro-program command. This operation under a single command must be added to the advantages derived from a uniform storage construction.

According to this invention it is possible to read-out from any arbitrary number of storage locations under control of only one micro-program command by automatic address changes once the address of the micro-program command is in a specific register. More than two storage locations may be read out under control of one micro-command by sequential changes of the address. It is also of course possible to change the operational part stored in part OR of the register 5 automatically.

In applying the system of this invention it is immaterial which particular part of the address is altered. The particular part to be altered may be determined by the requirements of the particular program to be instrumented.

While the invention has been illustrated and described as embodied in a system wherein only change of address takes place, it is not intended to be limited to the details shown, since various modifications and circuit changes may be made without departing in any way from the spirit of the present invention.

Without further analysis, the foregoing will so fully reveal the gist of the present invention that others can, by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A data procesing machine, comprising in combination, a storage adapted to contain a plurality of information units each consisting of a predetermined plurality of bits, in a plurality of storage locations corresponding to said plurality of information units, each of said storage locations being addressable by an address having a number of address bits in a determined order, and wherein major information units consisting of a number of bits exceeding but less than or equal to twice said predetermined plurality of bits is stored in a first and second one of said storage locations, the address of a second one of said storage locations differing from the address of the corresponding first one of said storage locations in one address bit in a determined position in said determined order of address bits; a memory means containing the addresses for addressing said storage locations; registered means adapted to receive said addresses from said memory means; read-out means adapted upon energization, to read out the information unit in the storage location corresponding to the address in said register; means for transferring the memory means address corresponding to said first storage location into said register and energizing said read-out means, thus causing said first part of said major information unit to be read out; and means for changing the address bit in said determined position in the order of address bits and reenergizing said read-out means, thus causing said second part of said major information unit to be read out, whereby said major information unit is read out under control of only one of said memory means addresses.

2. A system as set forth in claim 1, wherein said program contains a plurality of commands, one associated with each of said addresses; and wherein said change of address is accomplished under control of said corresponding command.

3. A system as set forth in claim 2, wherein caid data processing machine also comprises means for generating timing pulses; wherein the transfer to said register of the address corresponding to said first storage location takes place in synchronism with a first one of said timing pulses; and wherein said change of address takes place in synchronism with the subsequent one of said timing pulses.

4. A system as set forth in claim 3, wherein said means for changing one bit of the address in said register comprise pulse generating means adapted to generate a pulse for switching said one binary place from a first stable position to a second stable position in response to a suitable trigger pulse.

References Cited

UNITED STATES PATENTS

| | | | |
|---|---|---|---|
| 3,391,394 | 7/1968 | Ottaway et al. | 340—172.5 |
| 3,389,376 | 6/1968 | Packard | 340—172.5 |

| | | | |
|---|---|---|---|
| 3,380,034 | 4/1968 | Cerny | 340—12.5 |
| 3,351,909 | 11/1967 | Hummel | 340—172.5 |
| 3,297,998 | 1/1967 | Klein | 340—172.5 |
| 3,297,997 | 1/1967 | Grady et al. | 340—172.5 |
| 3,275,989 | 9/1966 | Glaser et al. | 340—172.5 |
| 3,208,047 | 9/1965 | Ridler | 340—172.5 |

GARETH D. SHAW, Primary Examiner